(12) United States Patent
Karlinsky et al.

(10) Patent No.: US 10,832,096 B2
(45) Date of Patent: Nov. 10, 2020

(54) REPRESENTATIVE-BASED METRIC LEARNING FOR CLASSIFICATION AND FEW-SHOT OBJECT DETECTION

(71) Applicant: International Business Machines Corporation, Armonk, NY (US)

(72) Inventors: Leonid Karlinsky, Mazkeret Batya (IL); Eliyahu Schwartz, Haifa (IL); Joseph Shtok, Binyamina (IL); Mattias Marder, Haifa (IL); Sivan Harary, Manof (IL)

(73) Assignee: International Business Machines Corporation, Armonk, NY (US)

( * ) Notice: Subject to any disclaimer, the term of this patent is extended or adjusted under 35 U.S.C. 154(b) by 137 days.

(21) Appl. No.: 16/240,927

(22) Filed: Jan. 7, 2019

(65) Prior Publication Data

US 2020/0218931 A1 Jul. 9, 2020

(51) Int. Cl.
*G06K 9/00* (2006.01)
*G06K 9/62* (2006.01)
(Continued)

(52) U.S. Cl.
CPC ........... *G06K 9/627* (2013.01); *G06K 9/3233* (2013.01); *G06K 9/6215* (2013.01);
(Continued)

(58) Field of Classification Search
None
See application file for complete search history.

(56) References Cited

U.S. PATENT DOCUMENTS

| 8,204,842 B1 * | 6/2012 | Zhang | G06N 5/02 706/45 |
| 9,031,331 B2 | 5/2015 | Mensink et al. | |

(Continued)

FOREIGN PATENT DOCUMENTS

CN 109117781 1/2019

OTHER PUBLICATIONS

Dong, Xuanyl, et al., Few-Example Object Detection with Model Communication, IEEE Transactions on Pattern Analysis and Machine Intelligence, 2018, pp. 1-13.
(Continued)

*Primary Examiner* — Shervin K Nakhjavan
(74) *Attorney, Agent, or Firm* — Barry D. Blount

(57) ABSTRACT

A method can include learning a common embedding space and a set of parameters for each one of a plurality of sets of mixture models, wherein one mixture model is associated with one class of objects within a set of object categories. The method can also include adding new mixture models to the set of mixture models to support novel categories based on a set of example embedding vectors computed for each one of the novel categories. Additionally, the method includes detecting in images a plurality of boxes with associated labels and corresponding confidence scores, wherein the boxes correspond to image regions comprising objects of both known categories and the novel categories. Furthermore, the method includes, given a query image, executing an instruction based on the common embedding space and the set of mixture models, the instruction comprising identifying objects from both categories in the query image.

20 Claims, 7 Drawing Sheets

(51) Int. Cl.
*G06K 9/32* (2006.01)
*G06N 3/04* (2006.01)

(52) U.S. Cl.
CPC ......... *G06K 9/6223* (2013.01); *G06K 9/6232* (2013.01); *G06N 3/04* (2013.01)

(56) References Cited

U.S. PATENT DOCUMENTS

| | | | |
|---|---|---|---|
| 10,102,443 B1 | 10/2018 | Huang et al. | |
| 2003/0123737 A1* | 7/2003 | Mojsilovic | G06K 9/726 382/224 |
| 2009/0208118 A1* | 8/2009 | Csurka | H04N 1/3873 382/228 |
| 2012/0054658 A1* | 3/2012 | Chuat | G06F 16/583 715/771 |
| 2014/0105457 A1* | 4/2014 | Metzler | G01C 1/04 382/103 |
| 2014/0310218 A1* | 10/2014 | Min | G06N 3/08 706/16 |
| 2015/0117764 A1 | 4/2015 | Zhu et al. | |
| 2015/0125073 A1* | 5/2015 | Hwang | G06K 9/00671 382/159 |
| 2016/0078359 A1* | 3/2016 | Csurka | G06K 9/6262 706/12 |
| 2016/0307070 A1 | 10/2016 | Jiang et al. | |
| 2017/0372169 A1 | 12/2017 | Li | |
| 2018/0107660 A1* | 4/2018 | Wang | G06F 16/10 |
| 2019/0258895 A1* | 8/2019 | Sacheti | G06F 16/51 |
| 2019/0279075 A1* | 9/2019 | Liu | G06N 3/084 |
| 2020/0193552 A1* | 6/2020 | Turkelson | G06K 9/6228 |

OTHER PUBLICATIONS

Ren, Shaoqing, et al., Faster R-CNN: Towards Real-Time Object Detection with Region Proposal Networks, Abstract, 1 page; submitted Jun. 4, 2015; Paper: arXiv:1506.01497v3 [cs.CV], Jan. 6, 2016, pp. 1-14.

Schroff, Florian, et al., FaceNet: A Unified Embedding for Face Recognition and Clustering, In Proceedings of the IEEE conference on computer vision and pattern recognition, arXiv:1503.03832v1 [cs.CV] Mar. 2015, pp. 1-9.

Wang, Yu-Xiong, et al., Low-Shot Learning from Imaginary Data, IEEE Explore, Computer Vision Foundation, pp. 7278-7286, dated Apr. 3, 2018.

International Search Report and Written Opinion for PCT Application No. PCT/IB2019/060353, dated Mar. 20, 2020, 9 pages.

\* cited by examiner

200

REPRESENTATIVE-BASED METRIC LEARNING FOR CLASSIFICATION AND FEW-SHOT OBJECT DETECTION

BACKGROUND

The present disclosure relates to detecting objects in images, and more specifically, but not exclusively, to detecting objects in images using machine learning techniques trained with a limited number of example images of an object.

SUMMARY

According to an embodiment described herein, a system can include a processor to implement a neural network architecture comprising computer-executable instructions that cause the processor to learn a common embedding space and a set of parameters for each one of a plurality of sets of mixture models, wherein one mixture model is associated with one class of objects within a set of object categories. The processor can also add new mixture models to the set of mixture models to support novel categories based on a set of example embedding vectors computed for each one of the novel categories. Additionally, the processor can detect in images a plurality of boxes with associated labels and corresponding confidence scores, wherein the boxes correspond to image regions comprising objects of both known categories and the novel categories. Furthermore, the processor can, given a query image, execute an instruction based on the common embedding space and the set of mixture models, the instruction comprising identifying objects from the known categories and the novel categories in the query image.

In some embodiments, a method for detecting objects in images can include learning a common embedding space and a set of parameters for each one of a plurality of sets of mixture models, wherein one mixture model is associated with one class of objects within a set of object categories. The method can also include adding new mixture models to the set of mixture models to support novel categories based on a set of example embedding vectors computed for each one of the novel categories. Additionally, the method can include detecting in images a plurality of boxes with associated labels and corresponding confidence scores, wherein the boxes correspond to image regions comprising objects of both known categories and the novel categories. Furthermore, the method can include, given a query image, executing an instruction based on the common embedding space and the set of mixture models, the instruction comprising identifying objects from the known categories and the novel categories in the query image.

In yet another embodiment, a computer program product for detecting objects in images can include a computer readable storage medium having program instructions embodied therewith, wherein the computer readable storage medium is not a transitory signal per se. The program instructions can be executable by a processor to cause the processor to learn a common embedding space and a set of parameters for each one of a plurality of sets of mixture models, wherein one mixture model is associated with one class of objects within a set of object categories. The program instructions can be executable by a processor to cause the processor to add new mixture models to the set of mixture models to support novel categories based on a set of example embedding vectors computed for each one of the novel categories. Additionally, the program instructions can be executable by a processor to cause the processor to detect in images a plurality of boxes with associated labels and corresponding confidence scores, wherein the boxes correspond to image regions comprising objects of both known categories and the novel categories. Furthermore, the program instructions can be executable by a processor to cause the processor to, given a query image, execute an instruction based on the common embedding space and the set of mixture models, the instruction comprising identifying objects from the known categories and the novel categories in the query image.

DETAILED DESCRIPTION

Figure 1:
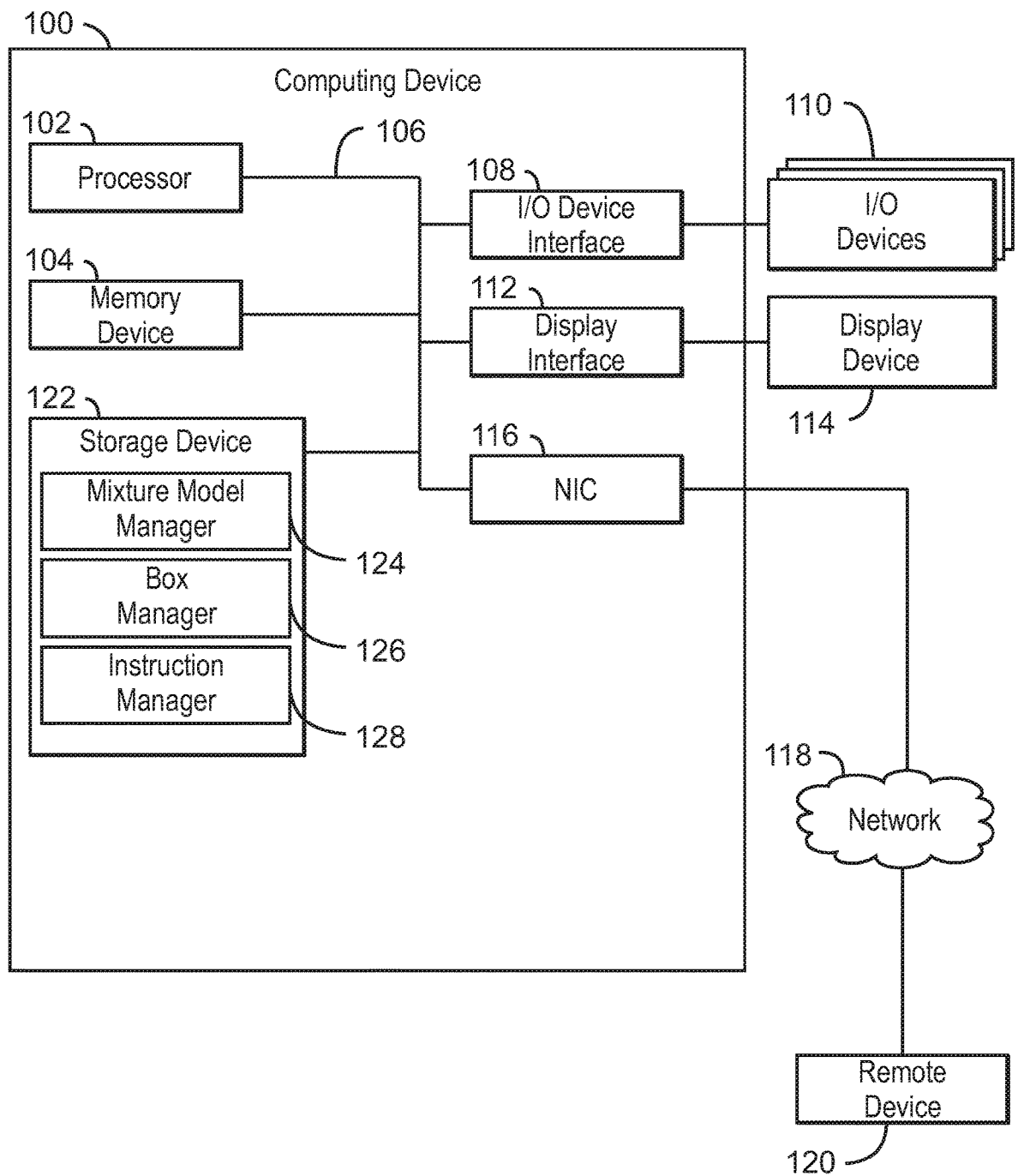
FIG. 1 depicts a block diagram of an example computing system that can detect objects in images using machine learning techniques according to an embodiment described herein.

Machine learning techniques or deep learning techniques related to image processing can analyze and process image data such as photographs, videos, and the like. Due to the success of deep learning networks (DNNs) in the tasks of image classification and detection, the DNNs are now used as feature extractors for computer vision applications. However, DNN models can require a significant amount of training data and in many applications, only a few training samples per class to learn a classifier. This is known as the few-shot learning problem.

In some embodiments, techniques include an approach for distance metric learning (DML) and demonstrate its effectiveness on both few-shot object detection and object classification. Each class is represented by a mixture model with multiple modes, and the centers of these modes are considered as the representative vectors for the class. Unlike previous methods, techniques herein simultaneously learn the embedding space, backbone network parameters, and the representative vectors of the training categories in a single end-to-end training process.

For few-shot object detection, techniques can include the deformable-FPN variant of the Faster-RCNN that rely on a region proposal network (RPN) to generate regions of interest (ROI). The techniques herein can also include a classifier head that classifies these ROIs into one of the object categories or a background region. In order to learn a robust detector with just a few training examples, techniques include replacing the classifier head with a subnet that learns to compute class posteriors for each ROI using the DML approach. The input to this subnet can include the feature vectors pooled from the ROIs. In some embodiments, the class posteriors for a given ROI are computed by comparing its embedding vector to the set of representatives for each category. The detection task can include solving "an open set recognition problem," namely to classify ROIs into both the structured foreground categories and the unstructured background category. In this context, the joint end-to-end training prevents the inefficient technique of separately training the DML by sampling background ROIs. In the few-shot detection techniques, new categories can be incorporated into the detector. This can be done by replacing the learned representatives (corresponding to old categories) with embedding vectors computed from the foreground ROIs of the few training examples given for these categories (k examples for k-shot detection).

In some embodiments, instead of the alternating training of embedding and clustering, techniques herein include end-to-end training a single (monolithic) network architecture capable of learning the DML embedding together with the representatives (modes of the mixture distributions). Effectively, this brings the clustering inside the end-to-end network training. Accordingly, the techniques herein include a novel sub-net architecture for jointly training an embedding space together with the set of mixture distributions in this space, having one (multi-modal) mixture for each of the categories. This architecture enables both DML-based object classification and few-shot object detection. Second, techniques herein can equip an object detector with a DML classifier head that can admit new categories, and thus transform the object detector into a few-shot detector. In some embodiments, the set of representatives serves as an internal memory to pass information between training batches.

In embodiments described herein, a deep learning technique can be used to determine a common embedding space and a set of parameters for a set of mixture models. Each mixture model can be associated with a separate class of objects within a set of object categories. In some embodiments, the deep learning technique can also add new mixture models to the set of mixture models to support novel categories based on a set of example embedding vectors computed for each one of the novel categories. Additionally, the deep learning technique can include detecting in images a plurality of boxes with associated labels and corresponding confidence scores, wherein the boxes correspond to image regions comprising objects of both known categories and the novel categories. Furthermore, the deep learning technique can include, given a query image, executing an instruction based on the common embedding space and the set of mixture models, the instruction comprising identifying objects from the known categories and the novel categories in the query image. Therefore, as discussed in greater detail below in relation to FIGS. 1, 2, 3, 4A, and 4B, a device can detect a previously unidentified object from an image using deep learning techniques. Specifically, the techniques herein can detect and identify objects that belong to classes of objects based on unique features of the objects. For example, the techniques can identify objects such as vehicles, buildings, people, and the like. In some examples, deep learning techniques can perform end-to-end object detection without specifically defining features of each class of objects.

With reference now to FIG. 1, an example computing device is depicted that can detect objects in images using machine learning techniques. The computing device 100 may be for example, a server, desktop computer, laptop computer, tablet computer, or smartphone. In some examples, computing device 100 may be a cloud computing node. Computing device 100 may be described in the general context of computer system executable instructions, such as program modules, being executed by a computer system. Generally, program modules may include routines, programs, objects, components, logic, data structures, and so on that perform particular tasks or implement particular abstract data types. Computing device 100 may be practiced in distributed cloud computing environments where tasks are performed by remote processing devices that are linked through a communications network. In a distributed cloud computing environment, program modules may be located in both local and remote computer system storage media including memory storage devices.

The computing device 100 may include a processor 102 that is adapted to execute stored instructions, a memory device 104 to provide temporary memory space for operations of said instructions during operation. The processor can be a single-core processor, multi-core processor, computing cluster, or any number of other configurations. The memory 104 can include random access memory (RAM), read only memory, flash memory, or any other suitable memory systems.

The processor 102 may be connected through a system interconnect 106 (e.g., PCI®, PCI-Express®, etc.) to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The processor 102 may also be linked through the system interconnect 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100. In addition, a network interface controller (NIC) 116 may be adapted to connect the computing device 100 through the system interconnect 106 to the network 118. In some embodiments, the NIC 116 can transmit data using any suitable interface or protocol, such as the internet small computer system interface, among others. The network 118 may be a cellular network, a radio network, a wide area network (WAN), a local area network (LAN), or the Internet, among others. A remote device 120 may connect to the computing device 100 through the network 118.

In some examples, the processor 102 can be linked through the system interconnect 106 to the storage device 122, which can include a mixture model manager 124, a box manager 126, and an instruction manager 128. In some embodiments, the mixture model manager 124 can learn a common embedding space and a set of parameters for each one of a plurality of sets of mixture models, wherein one mixture model is associated with one class of objects within a set of object categories. The mixture model manager 124 can also add new mixture models to the set of mixture models to support novel categories based on a set of example embedding vectors computed for each one of the novel categories. Additionally, the box manager 126 can detect in images a plurality of boxes with associated labels and corresponding confidence scores, wherein the boxes correspond to image regions comprising objects of both known categories and the novel categories. Furthermore, the instruction manager 128 can, given a query image, execute an instruction based on the common embedding space and the set of mixture models, the instruction comprising identifying objects from the known categories and the novel categories in the query image.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, modules, additional network interfaces, etc.). Furthermore, any of the functionalities of the mixture model manager 124, box manager 126, and instruction manager 128 are partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the mixture model manager 124, box manager 126, and instruction manager 128 can be implemented with logic, wherein the logic, as referred to herein, can include any suitable hardware (e.g., a processor, among others), software (e.g., an application, among others), firmware, or any suitable combination of hardware, software, and firmware.

Figure 2:
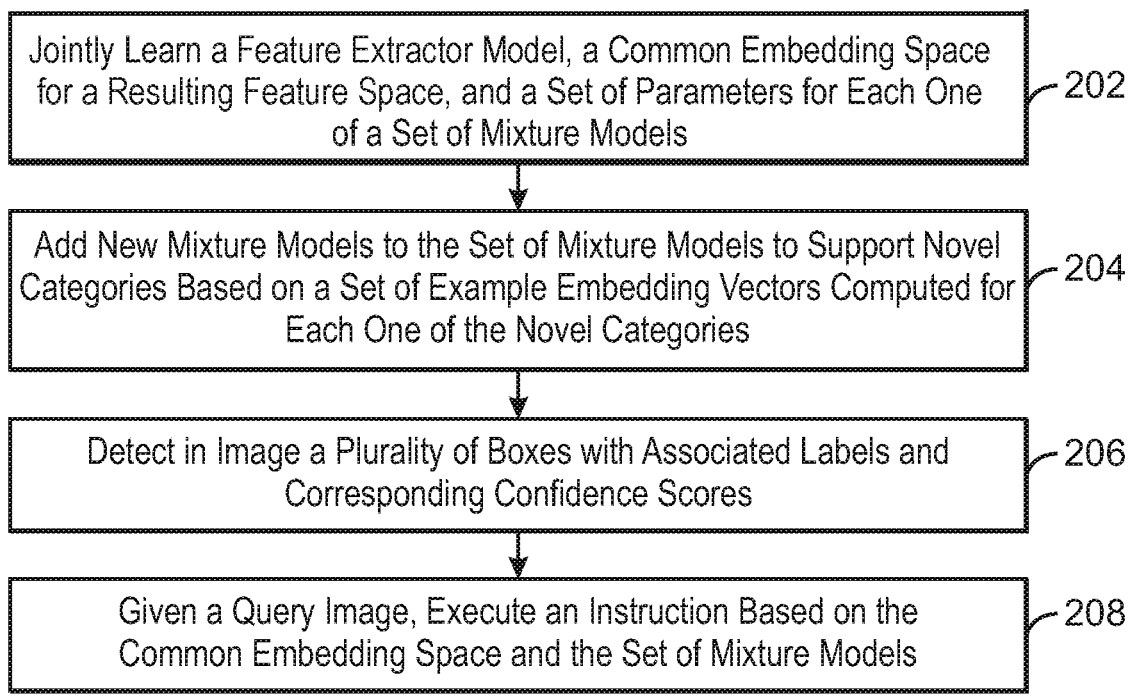
FIG. 2 is a process flow diagram of an example method that can detect objects in images using machine learning techniques according to an embodiment described herein.

FIG. 2 is a process flow diagram of an example method that can detect objects in images with deep learning techniques. The method 200 can be implemented with any suitable computing device, such as the computing device 100 of FIG. 1.

At block 202, the mixture model manager 124 can jointly learn or determine a feature extractor model, a common embedding space for a resulting feature space, and a set of parameters for each one of a plurality of sets of mixture models. In some examples, each mixture model can be associated with a separate class of objects within a set of object categories. An embedding space, as referred to herein, includes a linear vector space hosting the vectors produced by a deep embedding module, which is a part of the deep neural network architecture. The embedding space is a space of "representations" for the data points or images. In some examples, every image has exactly one corresponding point in the embedding space. In some embodiments, the embedding space is of a much lower dimension than the original data point or image. The mixture models can include Gaussian mixture models that are models for probability distribution in a vector space, defined as a weighted convex combination of multiple modes. Convex, as referred to herein, can indicate that the linear weights of the modes sum to a value of one. In some embodiments, each mode is a Gaussian density function defined by some expectation or mean vector and a positive definite covariance matrix. In some embodiments, one mixture model is associated with one class of objects within a set of object categories. The parameters of the mixture models, as referred to herein, can include a set of values for mode expectation vectors, covariance matrices, and mixture coefficients for a Gaussian Mixture Model.

In some embodiments, the mixture model manager 124 can train the embedding space or a deep embedding module and the parameters of the mixture models to detect and classify the images in the known categories using a region proposal network and a classifier head based on probabilistic inference on the mixture models. The classifier head, as referred to herein, is a sub-net of a neural network comprised of several top layers (closest to the output) that is responsible for classifying hypothesis boxes generated by another sub-net referred to as the RPN (Region proposal Network). Both the classifier head and the RPN sit on top of a shared neural network starting directly on the inputs, which is referred to as the back bone.

In some examples, the mixture model manager 124 can determine that at least one training image is to be excluded from generating the set of mixture models. In some examples, the mixture model manager 124 can determine the images to be excluded by detecting a training region within the image that has a background proximity value that is above a threshold value, wherein the background proximity is computed as a weighted sum of Euclidean distances of the training region from the set of background regions in that image. As the neural network is trained by the mixture model manager 124, a weighted average or sum of a cross entropy loss and an embedded loss can be calculated. The embedding loss can be based on distances between the embedded vectors and modes of mixture distributions for the categories. In some embodiments, the cross entropy loss is based on distances between the embedded vectors and modes of mixture distributions for the categories. The embedding loss can penalize any of the training points that are closer to a mode of an incorrect class than the distance to a closest correct class mode plus a margin parameter. In some examples, the cross entropy loss is based on distances between the embedding vectors and modes of mixture distributions for the categories. In some examples, the mixture model manager 124 can execute a plurality of SGD (Stochastic Gradient Descent) training iterations to enable adapting the neural network architecture to the novel categories.

At block 204, the mixture model manager 124 can add new mixture models to the set of mixture models to support novel categories based on a set of example embedding vectors computed for each one of the novel categories. Embedding vectors, as referred to herein, are elements in the embedding space. The novel categories can include categories of images or objects that were not included in training images used to learn the common embedding space. In some embodiments, the new mixture models corresponding to new classes are added to the set of mixture models corresponding to existing classes. The mixture models for the new classes can be created based on a set of embedding vectors corresponding to examples for the new classes. In some embodiments, the mixture models for the new classes are generated from a set of embedded examples for the new classes using clustering of the examples to K prototypes or centers of K clusters. In some examples, the mixture model manager 124 can set mixing coefficients for the mixtures of the new classes to a value of one.

At block 206, the box manager 126 can detect in images a plurality of boxes with associated labels and corresponding confidence scores. The boxes correspond to image regions comprising objects of both known categories and the novel categories. The boxes are detected using a generic mechanism called Region Proposal Network (or RPN) that is a neural network applied to a sliding window receptive field passing over the image on a regular grid steps. For each step, the window in question is classified into K×2 categories, corresponding to K anchors (different proposed aspect ratios of the possible objects) times two categories equals an object or background. For each anchor classified as an object, a regression is performed computing a proposal bounding box for that object posed as a relative deformation from the default box for the anchor. The above process is performed on multiple scales of the image.

At block 208, the instruction manager 128 can, based on a detected query image, execute an instruction based on the common embedding space and the set of mixture models. The instruction can include identifying objects from the known categories and the novel categories in the query image. In some embodiments, the instruction manager 128 can execute the instruction by computing a probability for at least one embedding vector of at least one proposed region in the query image to belong to one of the novel categories based on the parameters of the mixture model computed for each one of the novel categories.

The process flow diagram of FIG. 2 is not intended to indicate that the operations of the method 200 are to be executed in any particular order, or that all of the operations of the method 200 are to be included in every case. Additionally, the method 200 can include additional operations.

Figure 3:
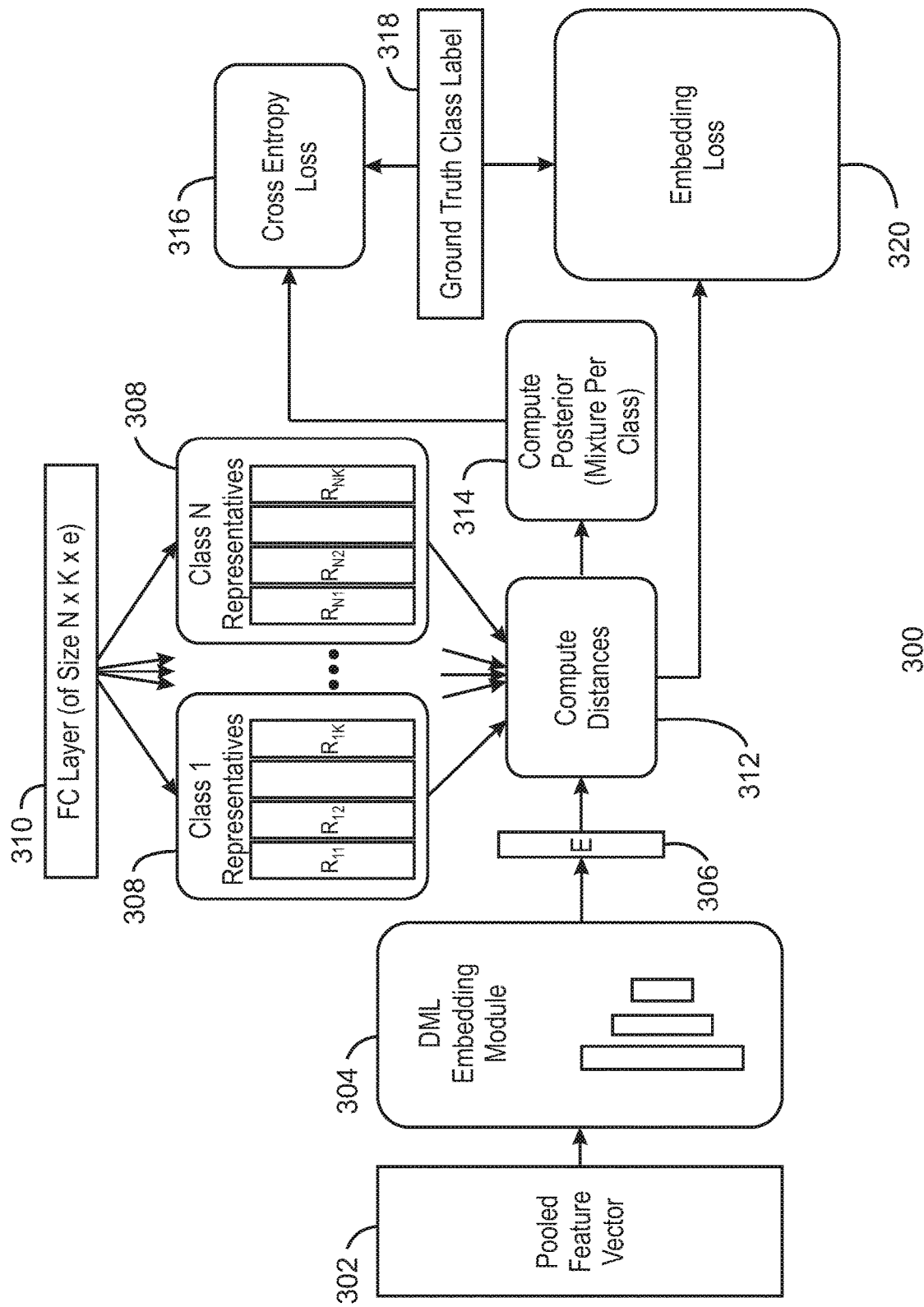
FIG. 3 is an example sub-net architecture of embodiments described herein.

FIG. 3 is an example sub-net architecture of embodiments described herein. The sub-net architecture 300 can be implemented with any suitable computing device such as computing device 100 of FIG. 1.

The sub-net architecture 300 can determine losses that enable training a DML embedding jointly with the multi-modal mixture distribution used for computing the class posterior in the resulting embedding space. The sub-net architecture 300 can become a DML-based classifier head, which can be attached on top of a classification or a detection backbone. In some examples, the sub-net architecture 300 is trained jointly with the feature producing backbone.

In some embodiments, the training of the sub-net architecture 300 is organized in batches or the input of the subnet can be a single pooled feature vector 302 or $X \in \mathbb{R}^f$ computed by a backbone for the given image or ROI. Examples for a backbone can include Inception V3 or an FPN without the RCNN. A DML embedding module 304 can include a few fully connected (FC) layers with batch normalization (BN) and ReLU non-linearity such as two or three layers, among others. The output of the embedding module is an embedded vector 306 or $E=E(X) \in \mathbb{R}^e$, wherein e<<f. As an additional set of trained parameters, a set of representatives 308 are detected, wherein the representatives include $R_{ij} \in \mathbb{R}^e$. In some embodiments, each vector $R_{ij}$ represents the center of the j-th mode of the learned discriminative mixture distribution in the embedding space for the i-th class out of a total of N classes. In some examples, the sub-net architecture 300 includes a fixed number of K modes (peaks) in the distribution of each class, so $1 \leq j \leq k$.

The representatives can be realized as weights of an FC layer 310 of size N·K·e receiving a fixed scalar input value of one. The output of this layer is reshaped to an N*K*e tensor. During training, this construction flows the gradients to the weights of the FC layer and learns the representatives. For a given image (or an ROI, in the case of the detector) and its corresponding embedding vector E, the sub-net architecture 300 computes 312 the N*K distance matrix whose elements $d_{ij}(E)=d(E, R_{ij})$ are the distances from E to every representative $R_{ij}$. These distances are used to compute the probability of the given image or ROI in each mode j of each class i as illustrated in Equation 1 below:

$$p_{ij}(E) \propto \exp\left(\frac{-d_{ij}^2(E)}{2\sigma^2}\right) \quad \text{Eq. (1)}$$

In Eq. 1, it is assumed that the class distributions are mixtures of isotropic multi-variate Gaussians with variance $\delta^2$. In some embodiments, the sub-net architecture 300 does not learn the mixing coefficients. The sub-net architecture 300 can set the discriminative class posterior to be:

$$\mathbb{P}(C=i|X)=\mathbb{P}(C=i|E)=\max_{j=1,\ldots,K} p_{ij}(E) \quad \text{Eq. (2)}$$

In Eq. 2, C=i denotes class i and the maximum is taken over the modes of its mixture. This conditional probability is an upper bound on the actual class posterior. The sub-net architecture 300 can use this approximation for one-shot detection, at test time, so that the representatives are replaced with embedded examples of novel classes that are unseen during training. Mixture coefficients are associated with specific modes, and since the modes change at test time, learning the mixture coefficients becomes highly non-trivial. Therefore, the use of the upper bound in Eq. 2 eliminates the need to estimate the mixture coefficients. In some embodiments, the sub-net architecture 300 can predict the mixture coefficients and the covariance of the modes as a function of E or X.

Having computed the class posterior 314, the sub-net architecture 300 can also estimate a discriminative posterior for the open background (B) class. In some embodiments, the sub-net architecture 300 does not model the background probability, but instead it is estimated via its lower bound using the foreground or class probabilities:

$$\mathbb{P}(B|X)=\mathbb{P}(B|E)=1-\max_{ij} p_{ij}(E) \quad \text{Eq. (3)}$$

Having P(C=i|X) and P(B|X) computed in the sub-net architecture 300, a sum of two losses can be used to train a model (DML subnet+backbone). The first loss is the cross entropy (CE) loss 316 with the ground truth labels 318 given for the image (or ROI) corresponding to X. The other loss or embedding loss 320 is intended to ensure there is at least a margin between the distance of E to the closest representative of the correct class, and the distance of E to the closest representative of a wrong class as illustrated in Equation 4 below. In Equation 4, i* is the correct class index for the current example and $|\bullet|_+$ is the ReLU function.

$$L(E, R) = \left| \min_{j} d_{i*j}(E) - \min_{j, i \neq i*} d_{ij}(E) + \alpha \right| \quad \text{Eq. (4)}$$

Figure 4:
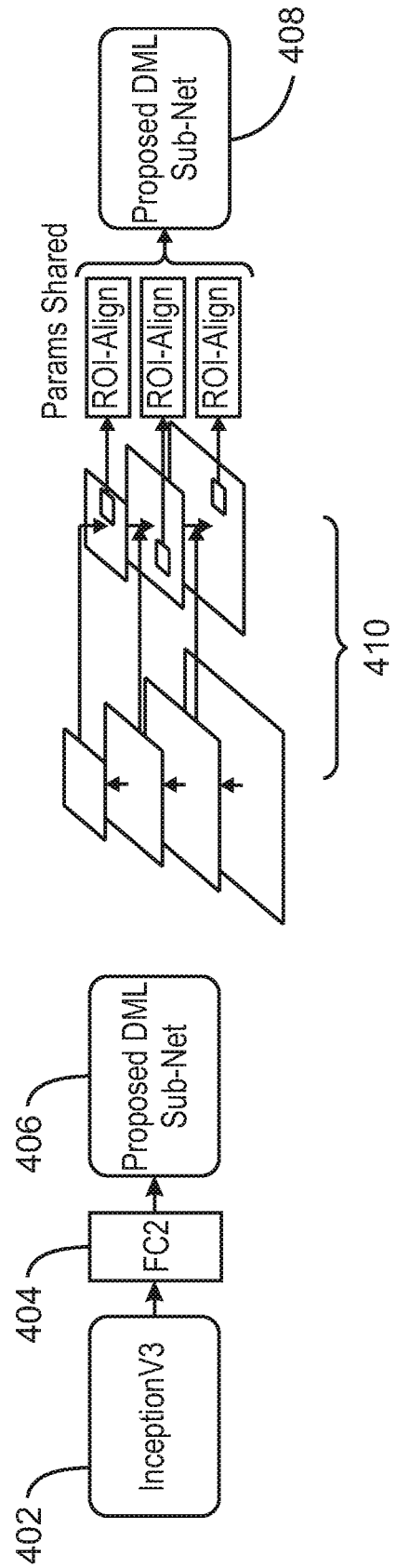
FIG. 4A illustrates an example network architecture for DML based classification.
FIG. 4B illustrates an example network architecture for few-shot detection.

FIG. 4A illustrates an example network architecture for DML based classification. FIG. 4B illustrates an example network architecture for few-shot detection. The proposed DML sub-net is integrated within the full network architectures used for the DML-based classification and the few-shot detection experiments.

For DML-based classification, an InceptionV3 402 backbone can be used by attaching the proposed DML subnet to the layer before its last FC layer. The embedding module of the sub-net can include two FC layers 404 of sizes 2048 and 1024, or any other suitable size. The first FC layer 404 can include BN and ReLU, and the second FC layer 404 can include linear activation. This is followed by an L2 normalization of the embedding vectors. In some embodiments, the layers are initialized randomly. In some examples, DML-based classification experiments can include setting δ=0.5 and K=3 representatives per category. Each training batch can be constructed by randomly sampling M=12 categories and sampling D=4 random instances from each of those categories.

In some DML-based classification examples, there is no background category B. Accordingly, the class mixtures may not process points that are outliers to all of the mixtures. Therefore, the proposed DML sub-net 406 can use a mixture model variant with equally weighted modes, replacing the class posterior in Eq. 2 with its softer normalized version. This is illustrated in Equation 5 below:

$$\mathbb{P}(C=i|X) = \mathbb{P}(C=i|E) = \frac{\sum_{j=1}^{K} pij(E)}{\sum_{i=1}^{N}\sum_{j=1}^{K} pij(E)} \quad \text{Eq. (5)}$$

As illustrated in FIG. 4B, for few-shot detection, the DML sub-net 408 can be used instead of the RCNN (the classification head) on top of the FPN backbone in its Deformable Convolutions (DCN) variant. The backbone can be pre-trained with any suitable techniques. The DML sub-net 408, including the representatives, can be initialized randomly. The network can be trained in an end-to-end fashion using online hard example mining (OHEM) and SoftNMS, among others. Features for a region of interest are extracted from a corresponding level of the feature pyramid network (FPN 410) and are used for processing and analysis by the DML sub-net. The embedding module in the DML sub-net 408 for one-shot detection can include two FC layers of width 1024 with BN and ReLU, and a final FC layer of width 256 with linear activation followed by L2 normalization. In some examples, K=5 representatives per class can be used during training, and the variable δ can be set to any suitable value such as 0.5. In some embodiments, each training batch can include one random training image.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
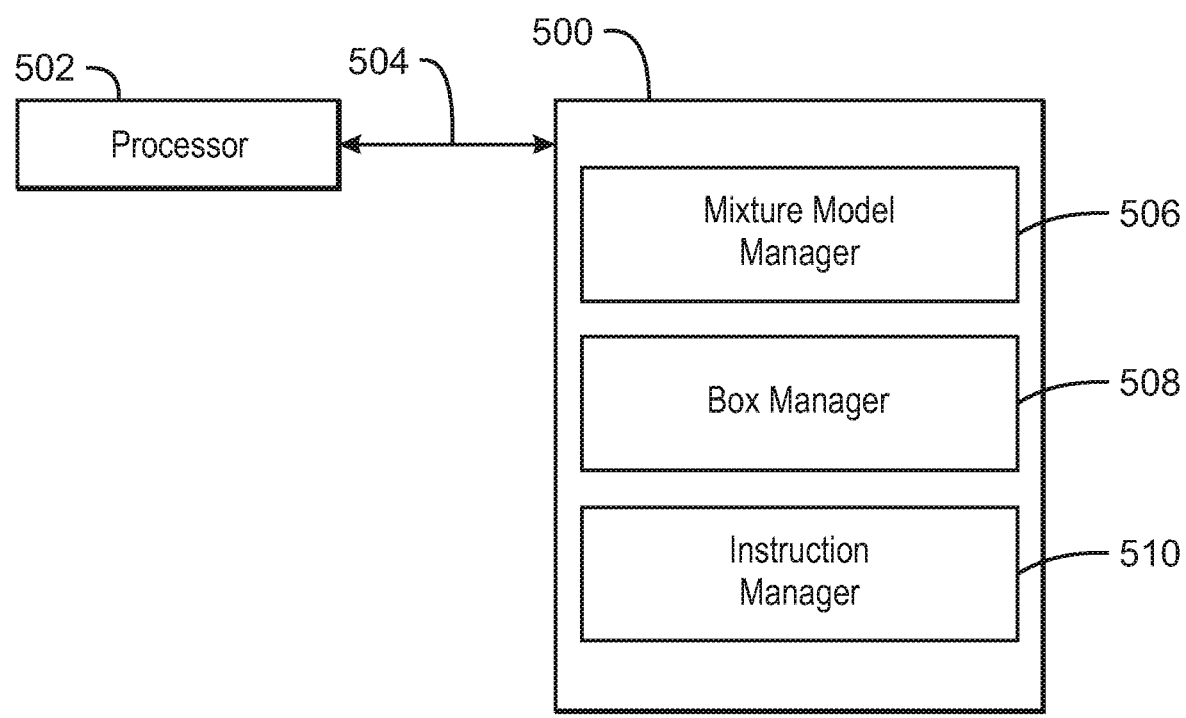
FIG. 5 is a tangible, non-transitory computer-readable medium that can detect objects in images using machine learning techniques according to an embodiment described herein.

Referring now to FIG. 5, a block diagram is depicted of an example of a tangible, non-transitory computer-readable medium that can detect and identify objects in images using deep learning techniques. The tangible, non-transitory, computer-readable medium 500 may be accessed by a processor 502 over a computer interconnect 504.

Furthermore, the tangible, non-transitory, computer-readable medium 500 may include code to direct the processor 502 to perform the operations of the current method. For example, a mixture model manager 506 can learn a common embedding space and a set of parameters for each one of a plurality of sets of mixture models, wherein one mixture model is associated with one class of objects within a set of object categories. The mixture model manager 506 can also add new mixture models to the set of mixture models to support novel categories based on a set of example embedding vectors computed for each one of the novel categories. Additionally, a box manager 508 can detect in images a plurality of boxes with associated labels and corresponding confidence scores, wherein the boxes correspond to image regions comprising objects of both known categories and the novel categories. Furthermore, the instruction manager 510 can, given a query image, execute an instruction based on the common embedding space and the set of mixture models, the instruction comprising identifying objects from the known categories and the novel categories in the query image.

It is to be understood that any number of additional software components not shown in FIG. 5 may be included within the tangible, non-transitory, computer-readable medium 500, depending on the specific application. Furthermore, fewer software components than those shown in FIG. 5 can be included in the tangible, non-transitory, computer-readable medium 500.

Figure 6:
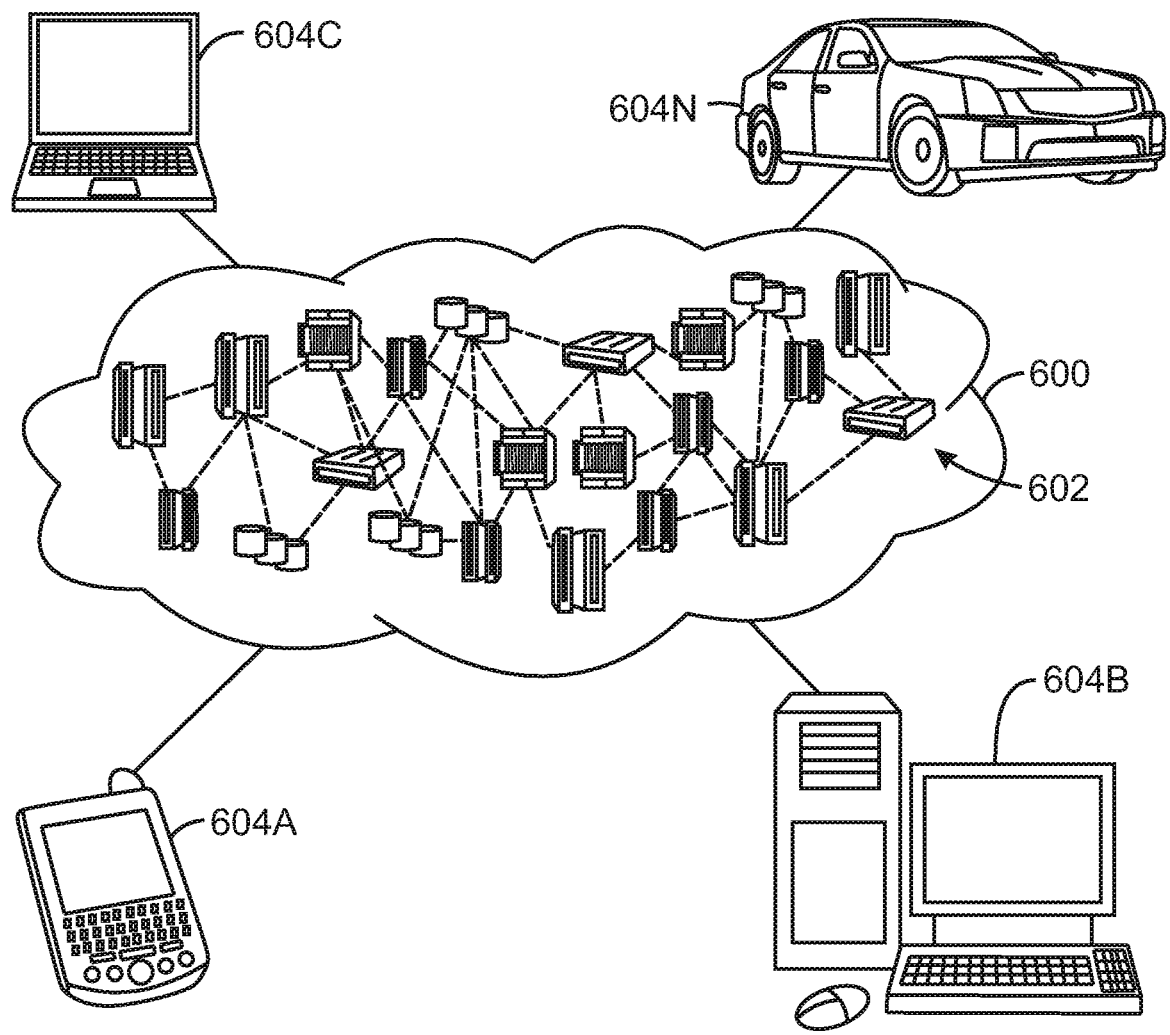
FIG. 6 depicts an illustrative cloud computing environment according to an embodiment described herein.

Referring now to FIG. 6, illustrative cloud computing environment 600 is depicted. As shown, cloud computing environment 600 comprises one or more cloud computing nodes 602 with which local computing devices used by cloud consumers, such as, for example, personal digital assistant (PDA) or cellular telephone 604A, desktop computer 604B, laptop computer 604C, and/or automobile computer system 604N may communicate. Nodes 602 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 604A-N shown in FIG. 6 are intended to be illustrative only and that computing nodes 602 and cloud computing environment 600 can communicate with any type of computerized device over any type of network and/or network addressable connection (e.g., using a web browser).

Figure 7:
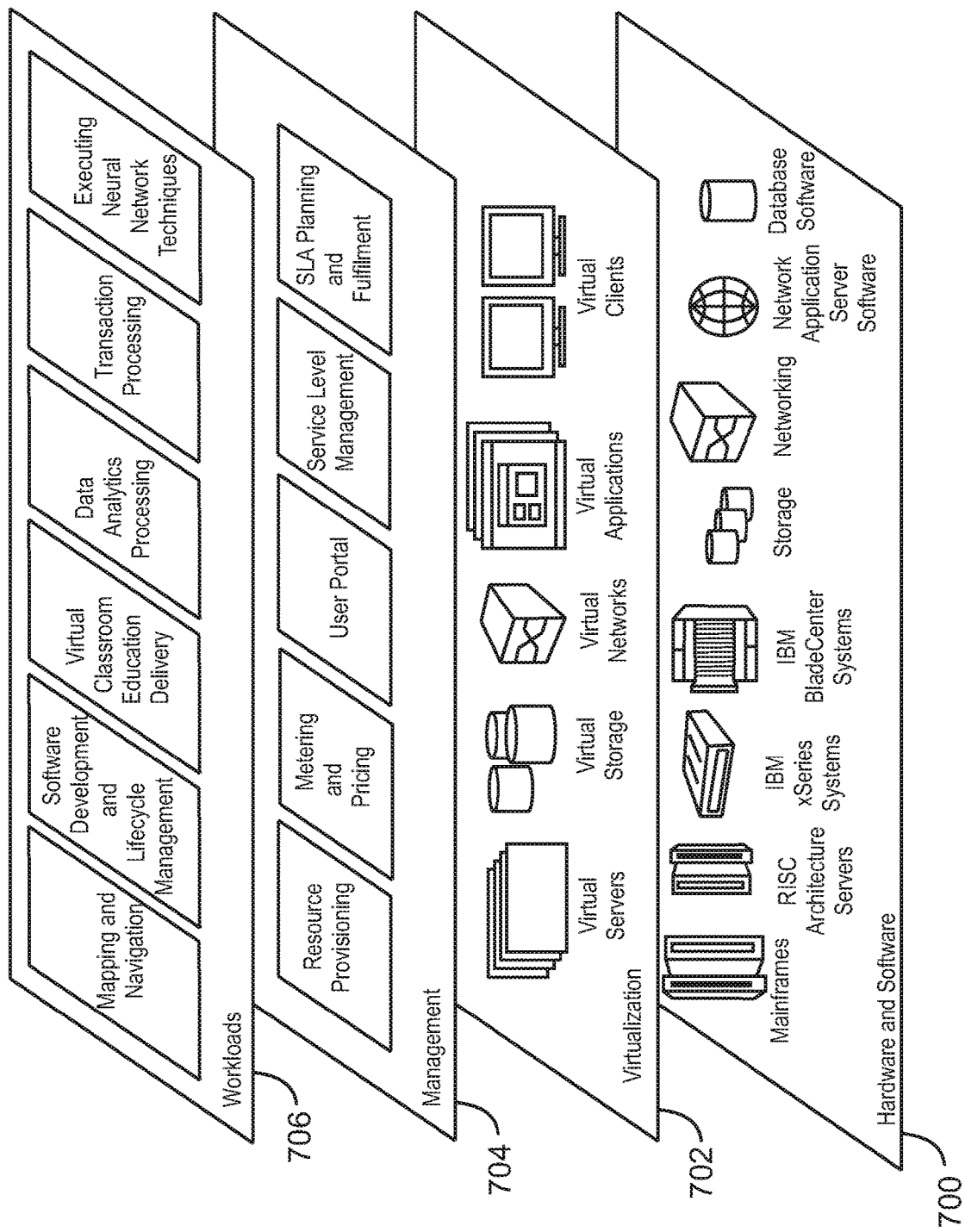
FIG. 7 depicts a set of functional abstraction layers provided by a cloud computing environment according to an embodiment described herein.

Referring now to FIG. 7, a set of functional abstraction layers provided by cloud computing environment 700 (FIG. 6) is shown. It should be understood in advance that the components, layers, and functions shown in FIG. 7 are intended to be illustrative only and embodiments of the invention are not limited thereto. As depicted, the following layers and corresponding functions are provided.

Hardware and software layer 700 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 702 provides an abstraction layer from which the following examples of virtual entities may be provided: virtual servers; virtual storage; virtual networks, including virtual private networks; virtual applications and operating systems; and virtual clients. In one example, management layer 704 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 706 provides examples of functionality for which the cloud computing environment may be utilized. Examples of workloads and functions which may be provided from this layer include: mapping and navigation; software development and lifecycle management; virtual classroom education delivery; data analytics processing; transaction processing; and executing deep learning techniques to identify objects in images.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
jointly learning a feature extractor model, a common embedding space for a resulting feature space, and a set of parameters for each one of a set of mixture models, wherein one mixture model is associated with one class of objects within a set of object categories;
adding new mixture models to the set of mixture models to support novel categories based on a set of example embedding vectors computed for each one of the novel categories;
detecting in images a plurality of boxes with associated labels and corresponding confidence scores, wherein the boxes correspond to image regions comprising objects of both known categories and the novel categories; and
given a query image, executing an instruction based on the common embedding space and the set of mixture models, the instruction comprising identifying objects from the known categories and the novel categories in the query image.

2. The method of claim 1, comprising training the embedding space and the parameters of the mixture models to detect and classify the images in the known categories using a region proposal network and a classifier head based on probabilistic inference on the mixture models.

3. The method of claim 2, wherein during training the method comprises calculating a weighted average of a cross entropy loss and an embedding loss.

4. The method of claim 3, wherein the embedding loss is based on distances between the embedding vectors and modes of mixture distributions for the categories.

5. The method of claim 3, wherein the embedding loss is penalizing training points that are closer to a mode of incorrect class than a distance to a closest correct class mode plus a margin parameter.

6. The method of claim 3, wherein the cross entropy loss is based on distances between the embedding vectors and modes of mixture distributions for the categories.

7. The method of claim 1, wherein the new mixture models corresponding to new classes are added to the set of mixture models corresponding to existing classes, the mixture models for the new classes to be created based on a set of embedding vectors corresponding to examples for the new classes.

8. The method of claim 7, wherein the mixture models for the new classes are generated from a set of embedded examples for the new classes using clustering of the examples to K prototypes or centers of K clusters.

9. The method in claim 7, wherein mixing coefficients for the mixtures of the new classes are set to one.

10. The method of claim 1, comprising executing the instruction by computing a probability for at least one embedding vector of at least one proposed region in the query image to belong to one of the known or novel categories based on the parameters of the mixture model computed for each one of the novel categories.

11. The method of claim 1, comprising determining that at least one of the training images is to be excluded from generating the set of mixture models.

12. The method of claim 11, comprising determining the images to be excluded by detecting a training region within the image that has a background proximity value that is above a threshold value, wherein the background proximity is computed as a weighted sum of Euclidean distances of the training region from a set of background regions in that image.

13. The method of claim 1, comprising executing a plurality of stochastic gradient descent (SGD) training iterations upon addition of the new mixture models to enable adapting the neural network architecture to the novel categories.

14. A system comprising:
a processor to implement a neural network architecture comprising computer-executable instructions that cause the processor to:
jointly learn a feature extractor model, a common embedding space for a resulting feature space, and a set of parameters for each one of a set of mixture models, wherein one mixture model is associated with one class of objects within a set of object categories;
add new mixture models to the set of mixture models to support novel categories based on a set of example embedding vectors computed for each one of the novel categories;
detect in images a plurality of boxes with associated labels and corresponding confidence scores, wherein the boxes correspond to image regions comprising objects of both known categories and the novel categories; and
given a query image, execute an instruction based on the common embedding space and the set of mixture models, the instruction comprising identifying objects from the known categories and the novel categories in the query image.

15. The system of claim 14, wherein the processor is to train the embedding space and the parameters of the mixture models to detect and classify the images in the known categories using a region proposal network and a classifier head based on probabilistic inference on the mixture models.

16. The system of claim 14, wherein the new mixture models corresponding to new classes are added to the set of mixture models corresponding to existing classes, the mixture models for the new classes to be created based on a set of embedding vectors corresponding to examples for the new classes.

17. The system of claim 16, wherein the mixture models for the new classes are generated from a set of embedded examples for the new classes using clustering of the examples to K prototypes or centers of K clusters.

18. The system of claim 16, wherein mixing coefficients for the mixtures of the new classes are set to one.

19. The system of claim 14, wherein the processor is to execute the instruction by computing a probability for at least one embedding vector of at least one proposed region in the query image to belong to one of the known or novel categories based on the parameters of the mixture model computed for each one of the novel categories.

20. A computer program product for detecting objects in images comprising a computer readable storage medium having program instructions embodied therewith, wherein the computer readable storage medium is not a transitory signal per se, the program instructions executable by a processor to cause the processor to:
- jointly learn a feature extractor model, a common embedding space for a resulting feature space, and a set of parameters for each one of a set of mixture models, wherein one mixture model is associated with one class of objects within a set of object categories;
- add new mixture models to the set of mixture models to support novel categories based on a set of example embedding vectors computed for each one of the novel categories;
- detect in images a plurality of boxes with associated labels and corresponding confidence scores, wherein the boxes correspond to image regions comprising objects of both known categories and the novel categories; and
- given a query image, execute an instruction based on the common embedding space and the set of mixture models, the instruction comprising identifying objects from the known categories and the novel categories in the query image.

\* \* \* \* \*